United States Patent [19]

Fujimoto et al.

[11] Patent Number: 5,093,454

[45] Date of Patent: Mar. 3, 1992

[54] ROOM TEMPERATURE-CURABLE SILICONE RUBBER COMPOSITION

[75] Inventors: Tetsuo Fujimoto; Masayoshi Anzai, both of Gunma, Japan

[73] Assignee: Toshiba Silicone Co., Ltd., Tokyo, Japan

[21] Appl. No.: 446,361

[22] Filed: Dec. 5, 1989

[30] Foreign Application Priority Data

Dec. 5, 1988 [JP] Japan .................................. 63-306014

[51] Int. Cl.$^5$ ................................................ C08G 77/04
[52] U.S. Cl. .......................................... 528/34; 528/17; 528/18; 528/19; 528/21; 528/901
[58] Field of Search .................... 528/34, 17, 18, 19, 528/21, 901

[56] References Cited

U.S. PATENT DOCUMENTS 4,797,446  1/1989  Dietlein et al. ................. 528/34
4,980,396 12/1990  Yoshida ........................... 528/34

Primary Examiner—Melvyn I. Marquis
Attorney, Agent, or Firm—Sughrue, Mion, Zinn, Macpeak & Seas

[57] ABSTRACT

A room temperature-curable silicone rubber composition comprising a polydiorganosiloxane having a silanol group at the both ends thereof, an organosilane or a partially hydrolyzed condensate thereof, an epoxyalkylalkoxysilane, and an organosilicon group-containing isocyanurate. The composition shows improved adhesive property to various materials and having excellent moisture resistance and hot water-resistant adhesive property, and is useful as a sealing material for various apparatuses and structures which are used in hot water or moist heat atmosphere.

11 Claims, No Drawings

ROOM TEMPERATURE-CURABLE SILICONE RUBBER COMPOSITION

FIELD OF THE INVENTION

This invention relates to a room temperature-curable silicone rubber composition showing improved adhesive property to various materials and having excellent moisture resistance and hot water-resistant adhesive property.

BACKGROUND OF THE INVENTION

Silicone rubber compositions curable at room temperature are already known, and one-package system compositions and two-package system are commercially available.

Such silicone rubber compositions comprise as basic components a polydiorganosiloxane having a silanol group at the terminals, an organosilicon compound having a silicon-functional group and an inorganic filler, and undergo condensation reaction in the presence or absence of water and/or a catalyst to cure into rubber-like materials. Utilizing this property, those compositions are used as sealing materials or adhesives. However, since a sufficient adhesive strength cannot generally be obtained by the above-described basic components only, adhesion promotive agents (hereinafter referred to as "an adhesion promoter") are further added as a third component to improve the compositions so as to have adhesive strength enough for practical use.

$H_2N(CH_2)_3Si(OC_2H_5)_3$, $HS(CH_2)_3Si(OCH_3)_3$, $[(CH_3)_3CO]_2Si(OCOCH_3)_2$, $CH_2=CHSi(OCH_3)_3$, $HSi(OC_2H_5)_3$, and the like are known as such adhesion promoters. Although addition of such adhesion promoters serves to improve the initial adhesive property of the compositions, there is a disadvantage that a peel phenomenon is observed in an accelerated deterioration test, particularly a deterioration test in hot water or high temperature and high humidity atmosphere (hereinafter referred to as "hot water test" and "moist heat test", respectively).

As a method for improving the deterioration in hot water, there have been proposed a method in which a reaction product of an aminoalkylalkoxysilane with an epoxyalkyl-alkoxysilane is used as an adhesion promoter (JP-A-48-75633), a method in which $(CH_3O)_3$-$Si(CH_2)_2C_6H_4CH_2NH(CH_2)_2NH_2$ is added (JP-A-60-60160), and a method in which a mixture of an amino-substituted silane and an epoxy group-containing silane is used (JP-B-63-23226). (The term "JP-A" and "JP-B" as used here in mean an "unexamined published Japanese patent application" and an "examined Japanese patent publication, respectively.)

However, the above prior art compositions also are still insufficient in adhesive property when they are evaluated by the moist heat test which is severer than the hot water test. Therefore, there has been a desire for a silicone rubber composition having good adhesive properties which are sufficient even when evaluated by both a hot water test and a moist heat test.

SUMMARY OF THE INVENTION

The present inventors have found that the adhesive properties of a room temperature-curable silicone rubber composition can be maintained for a long period of time even in hot water or in a high-temperature and high-humidity atmosphere, by the combined use of a specific epoxy-alkylalkoxysilane and a specific organosilicon group-containing isocyanurate, as an adhesion promoter. This invention has been completed based on this finding.

Accordingly, an object of the present invention is to provide a room temperature-curable silicone rubber composition which shows sufficient adhesive properties against a moist heat test, thus eliminating the above-described prior art problems.

DETAILED DESCRIPTION OF THE INVENTION

The room temperature-curable silicone rubber composition according to the present invention comprises (A) 100 parts by weight of a polydiorganosiloxane having a silanol group at the both ends thereof and having a viscosity as measured at 25° C. of from 500 to 200,000 cSt;

(B) 0.1 to 20 parts by weight of an organosilane or a partially hydrolyzed condensate thereof, the organosilane being represented by formula (I), $$(R^1)_a SiX_{4-a} \qquad (I)$$

wherein $R^1$ represents a su monovalent hydrocarbon group, X represents an organic group bonded to the silicon atom and selected from the group consisting of an alkoxy group, an enoxy group, an organoketoxime group and an organoamide group, and a is 0 or 1;

(C) 0.1 to 10 parts by weight of an epoxyalkyl-alkoxysilane represented by formula (II), $$Q-R^2-Si-(R^3)_b(OR^4)_{3-b} \qquad (II)$$

wherein $R^2$ represents a divalent hydrocarbon group having 1 to 4 carbon atoms, $R^3$ and $R^4$ each represents a monovalent hydrocarbon group having 1 to 4 carbon atoms, Q represents a glycidoxy group or an epoxycyclohexyl group, and b is 0 or 1; and (D) 0.1 to 10 parts by weight of an organosilicon group-containing isocyanurate represented by formula (III),

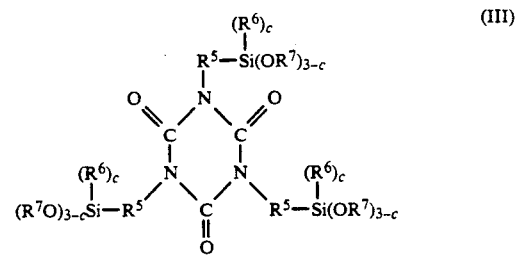

wherein $R^5$ represents a divalent hydrocarbon group having 1 to 4 carbon atoms, $R^6$ and $R^7$ each represents a monovalent hydrocarbon group having 1 to 4 carbon atoms, and c is 0 or 1.

Component (A) which can be used in the composition of this invention is a polydiorganosiloxane having a silanol group at both ends.

In this polydiorganosiloxane, examples of an organic group directly bonded to silicon atom include an alkyl group such as methyl, ethyl, propyl, butyl or hexyl; an alkenyl group such as vinyl or allyl; an aryl group such as phenyl; an aralkyl group such as β-phenylethyl; and a substituted monovalent hydrocarbon group such as chloromethyl or β-cyanoethyl. Of those, a monovalent hydrocarbon group such as methyl, vinyl or phenyl is generally advantageous from the standpoint of the easy synthesis of the polydiorganosiloxane. Further, most preferred of those is methyl because an intermediate for the intended polysiloxane is most easily available and the resulting polysiloxane can have the lowest viscosity than other kinds of polydiorganosiloxanes while retaining a sufficiently high degree of polymerization, and also because a composition having a good balance between the extrudability of the uncured composition and the physical properties of cured rubber-like elastomers obtained from the composition can be obtained. Hence, it is preferred that 85% or more of all the organic groups are methyl and it is more preferred that substantially all the organic groups are methyl. However, in the case where the cured rubber-like elastomer is required to have freeze resistance and heat resistance, it is preferred that part of the organic groups is phenyl.

Further, in the case where special properties such as solvent resistance and coatability are to be imparted to the cured rubber-like elastomer, it is preferred that other organic groups are suitably selected according to the desired properties.

The polydiorganosiloxane, component (A), has a viscosity as measured at 25° C. of from 500 to 200,000 cSt. If the viscosity thereof is below 500 cSt, the elongation of the cured rubber-like elastomer is insufficient. On the other hand, if the viscosity thereof exceeds 200,000 cSt, a uniform composition cannot be obtained and further the resulting composition shows poor extrudability. The preferred viscosity range of the polydiorganosiloxane is from 2,000 to 100,000 cSt.

Component (B) which can be used in the composition of this invention is an organosilane represented by the formula (I) or a partially hydrolyzed condensate thereof. This component (B) undergoes hydrolysis by the action of moisture and the resulting hydrolyzate easily undergoes a condensation reaction with silanol groups in component (A).

In the formula (I), preferred examples of the substituted or unsubstituted monovalent hydrocarbon group of $R^1$ are an alkyl group having 1 to 8 carbon atoms such as methyl, ethyl, propyl or butyl, an alkenyl group having 2 to 3 carbon atoms such as vinyl, and a phenyl group, form the standpoints of the easy synthesis of the organosilane and the crosslinking rate of the polydiorganosiloxane.

X in the formula (I) should be a group which can impart to the final composition a proper curing rate and good adhesive properties and does not result in the evolution of corrosive substances, during the curing of the composition, that may attack the substrates. Examples of such X include an alkoxy group such as methoxy, ethoxy, propoxy, isopropoxy or butoxy; an enoxy group such as butanone oxime; and an organoamide group such as N-methylacetamide.

Specific examples of the organosilane represented by the formula (I) include alkoxy group-containing compounds such as methyltrimethoxysilane, vinyltrimethoxysilane, methyltriethoxysilane, vinyltriethoxysilane, ethylorthosilicate and propylorthosilicate; enoxy group-containing compounds such as methyltripropenoxysilane and vinyltriisopropenoxysilane; oxime group-containing compounds such as methyltris(acetone oxime)silane and methyltris(butanone oxime)silane; and amide group-containing compounds such as methyltris(N-methylacetamide)silane and vinyltris(N-methylacetamide)silane. In addition to the above, examples of component (B) include partially hydrolyzed condensates of the above organosilanes. Examples of component (B) further include a low molecular weight polysiloxane having a straight-chained, branched or cyclic siloxane skeleton and a functional group as described above formed by bonding the organosilane represented by the formula (I) to other siloxane units.

The amount of component (B) added to the composition is from 0.1 to 20 parts by weight per 100 parts by weight of component (A). If the amount of component (B) is below 0.1 part by weight, crosslinking reaction does not proceed sufficiently. If the amount thereof is larger than 20 parts by weight, an excess of the crosslinking component which is not consumed by the crosslinking reaction adversely affects the properties of rubber-like elastomers obtained from the composition. The preferred amount of component (B) added is from 1 to 15 parts by weight per 100 parts by weight of component (A).

Component (C) which can be used in the composition of this invention is an epoxyalkylalkoxysilane represented by the formula (II), and serves to improve the adhesive properties of the composition.

In the formula (II), preferred examples of the divalent hydrocarbon groups having 1 to 4 carbon atoms of $R^2$ include alkylene groups having 1 to 4 carbon atoms.

The monovalent hydrocarbon groups having 1 to 4 carbon atoms of $R^3$ and $R^4$ preferably are an alkyl group having 1 to 4 carbon atoms.

Specific examples of component (C) include γ-glycidoxypropyltrimethoxysilane, γ-glycidoxypropylmethyldimethoxysilane, 3,4-epoxycyclohesylethyltrimethosysilane and 3,4-epoxycyclohexylethylmethyldimethoxysilane.

The amount of component (C) added to the composition is from 0.1 to 10 parts by weight per 100 parts by weight of component (A). If the amount of component (C) is below 0.1 part by weight, the self-adhesive properties of rubber-like elastomers obtained from the resulting composition are impaired, while the amount thereof exceeding 10 parts by weight is also disadvantageous in that the elasticity of the rubber-like elastomers becomes low. The preferred amount of component (C) is added from 0.5 to 5 parts by weight per 100 parts by weight of component (A).

Component (D) which can be used in the composition of this invention is an organosilicon group-containing isocyanurate represented by the formula (III). This component (D) acts, together with the above-described component (C), to improve the adhesive properties of the composition.

In the formula (III), preferred examples of the divalent hydrocarbon group having 1 to 4 carbon atoms of $R^5$ include the same groups as in $R^2$ in the formula (II), and preferred examples of the monovalent hydrocarbon groups having 1 to 4 carbon atoms of $R^6$ and $R^7$ include the same groups as in $R^3$ and $R^4$ in the formula (II).

Specific examples of the organosilicon group-containing isocyanurate represented by the formula (III) include 1,3,5-tris[3-(dimethoxymethylsilyl)propyl]isocyanurate, 1,3,5-tris[3-(triethoxysilyl)propyl]isocyanurate and 1,3,5-tris[3-(trimethoxysilyl)propyl]isocyanurate.

The amount of component (D) added to the composition is from 0.1 to 10 parts by weight per 100 parts by weight of component (A). If the amount of component (D) is below 0.1 part by weight, the self-adhesive properties of rubber-like elastomers obtained from the resulting composition are impaired, while an amount thereof exceeding 10 parts by weight is also disadvantageous in that the elasticity of the rubber-like elastomers becomes low. The preferred amount of component (C) added is from 0.5 to 5 parts by weight per 100 parts by weight of component (A).

It is preferred in the composition of this invention that the proportion of component (C) to component (D) is from about 0.05:1 to 2:1 in terms of the molar ratio of (C):(D), to further improve the adhesive properties in hot water and moist heat atmosphere.

It is preferred in the composition of this invention to use a catalyst to accelerate crosslinking reaction. Examples of such catalyst include amine compounds such as dimethylhexylamine, diethylhydroxylamine and tetramethylguanidine; quaternary ammonium salts such as tetramethylammonium chloride and trimethylhexyammonium chloride; metal salts of organic acids such as zinc oxtanoate, tin octonoate, dibutyltin diacetate, dibutyltin dioctonoate, dibutyltin dilaurate and dioctyltin dilaurate; and titanium compounds such as tetrabutyl titanate and 1,3-dioxypropane-bis(ethylacetoacetate)-titanium.

In addition to the above-described components (A) to (D), the composition of this invention can further contain, according to need, an inorganic filler such as diatomaceous earth, calcium carbonate, crushed quartz or fumed silica, a pigment, a thixotropic agent, a viscosity modifier for improving extrudability, an ultraviolet absorber, an antibacterial agent, a heat resistance improver, a flame retarder and the like.

The composition of this invention can be obtained by mixing the above-described components (A) to (D) and, if necessary, a catalyst, an inorganic filler and other additives, in the state that moisture is kept excluded therefrom. The thus-obtained composition may be stored in a sealed vessel so as to be used as a so-called one-pack type room temperature-curable silicone rubber composition which is cured by exposing it to moisture in the air when used. Alternatively, components (A) to (D) may be used as a so-called two-pack type room temperature-curable silicone rubber composition. That is, components (A) to (D) and other additives such as catalyst and an inorganic filler are suitably divided into two groups and separately packed in respective containers and stored, and they are mixed with each other before use to give a composition of this invention.

The composition of the present invention shows good adhesive property to materials such as glass, aluminum, concrete, plastic and others. The adhesive property of the composition of this invention to the above materials does never deteriorate even when the materials having adhered and cured thereon the composition are kept in hot water or a moist heat atmosphere for a long period of time.

The composition of this invention is useful as a sealing material for various apparatus and structures which are used in hot water or moist heat atmosphere and comprise materials as described above.

The present invention will be explained in more detail by reference to the following Examples and Comparative Examples, wherein all parts are by weight.

EXAMPLE 1

To 100 parts of polydimethylsiloxane having a viscosity of 10,000 cSt in which both ends of the molecular chain had been blocked with a silanol group were added 10 parts of hydrophobic fumed silica the surfaces of which had been subjected to a silane treatment and 0.2 part of dibutyltin dilaurate, and the resulting mixture was stirred until it became uniform. This uniform mixture was then mixed, in a water-free atmosphere, with 5 parts of vinyl-tris(methylethylketoxime)silane and, as adhesion promoters, 1 part of γ-glycidoxypropyltrimethoxysilane and 1 part of 1,3,5-tris[3-(dimethoxymethylsilyl)propyl]isocyanurate, and the resulting mixture was degassed to obtain a composition of the present invention.

The composition thus obtained was evaluated for adhesive properties in accordance with JIS A 5758, item 5-12, as follows.

The composition was coated on the adherends shown in Table 1 below. Subsequently, for curing the coatings, the resulting adherends were allowed to stand in an atmosphere of 55% R.H. at 20° C. for 14 days and then at 30° C. for 14 days, thereby preparing test pieces having cured coatings. The thus-obtained test pieces were subjected to a tensile test at a speed of 50 mm/min to determine the tensile bonding strength. The tensile test was conducted just after the preparation (initial stage), and also after test pieces were immersed in 50° C. hot water for 7 days, 100 days and 200 days.

The results obtained are shown in Table 1 below.

COMPARATIVE EXAMPLE 1

A comparative composition was obtained in the same manner as in Example 1 except that 1,3,5-tris[3-(dimethoxy-methylsilyl)propyl]isocyanurate was not added.

Using the composition thus obtained, the same tensile test as in Example 1 was conducted.

The results obtained are shown in Table 1 below.

COMPARATIVE EXAMPLE 2

A comparative composition was obtained in the same manner as in Example 1 except that γ-glycidoxypropyl-trimethoxysilane was not added.

Using the composition thus obtained, the same tensile test as in Example 1 was conducted.

The results obtained are shown in Table 1 below.

TABLE 1

| | | Example 1 | | Comparative Example 1 | | Comparative Example 2 | |
|---|---|---|---|---|---|---|---|
| Adherend | Conditions | Bonding strength (kg · f/cm$^2$) | Cohesive failure (%) | Bonding strength (kg · f/cm$^2$) | Cohesive failure (%) | Bonding strength (kg · f/cm$^2$) | Cohesive failure (%) |
| Glass | Initial stage | 6.5 | 100 | 2.8 | 30 | 3.4 | 10 |
| | 50° C. hot water 7 days | 6.5 | 100 | 1.1 | 10 | peeled off before test | peeled off before test |
| | 50° C. hot water 100 days | 6.3 | 100 | peeled off before test | peeled off before test | peeled off before test | peeled off before test |
| | 50° C. hot water 200 days | 6.2 | 100 | peeled off before test | peeled off before test | peeled off before test | peeled off before test |
| Soft steel | Initital stage | 6.8 | 100 | 2.2 | 10 | 2.8 | 10 |

TABLE 1-continued

| Adherend | Conditions | Example 1 | | Comparative Example 1 | | Comparative Example 2 | |
|---|---|---|---|---|---|---|---|
| | | Bonding strength (kg·f/cm$^2$) | Cohesive failure (%) | Bonding strength (kg·f/cm$^2$) | Cohesive failure (%) | Bonding strength (kg·f/cm$^2$) | Cohesive failure (%) |
| | 50° C. hot water 7 days | 6.7 | 100 | peeled off before test | peeled off before test | peeled off before test | peeled off before test |
| | 50° C. hot water 100 days | 6.4 | 100 | peeled off before test | peeled off before test | peeled off before test | peeled off before test |
| | 50° C. hot water 200 days | 6.2 | 100 | peeled off before test | peeled off before test | peeled off before test | |

EXAMPLE 2

100 Parts of polydimethylsiloxane having a viscosity of 20,000 cSt in which both ends of the molecular chain had been blocked with a silanol group was uniformly mixed with 60 parts of diatomaceous earth and 0.1 part of dibutyltin diacetate. This uniform mixture was then mixed, in a water-free atmosphere, with 3 parts of phenyltriethoxysilane and, as adhesion promoters, 3 parts of γ-glycidoxypropylmethyldimethoxysilane and 0.8 part of 1,3,5-tris[3-(triethoxysilyl)propyl]isocyanurate, and the resulting mixture was degassed to obtain a composition of the present invention.

Using the composition thus obtained, test pieces having cured coatings were prepared in the same manner as in Example 1. The test pieces were then subjected to a tensile test just after the preparation (initial stage) and also after being allowed to stand for 100 days in a moist heat atmosphere of 60° C and 95% R.H., thereby to determine the respective tensile bonding strength. The results obtained are shown in Table 2 below.

COMPARATIVE EXAMPLE 3

A comparative composition was obtained in the same manner as in Example 2 except that 2 parts of [aminoethyl-(aminomethyl)]phenyltrimethoxysilane was used in place of the two adhesion promoters used in Example 2.

Using the composition thus obtained, the same tensile test as in Example 2 was conducted.

The results obtained are shown in Table 2 below.

EXAMPLE 3

100 Parts of polydimethylsiloxane having a viscosity of 40,000 cSt in which both ends of the molecular chain had been blocked with a silanol group was uniformly mixed with 80 parts of calcium carbonate and 0.1 part of dibutyltin dilaurate. This uniform mixture was then mixed, in a water-free atmosphere, with 5 parts of vinyltris(N-methylacetoamido)silane and, as adhesion promoters, 1 part of 3,4-epoxycyclohexylethyltrimethoxysilane and 2.5 parts of 1,3,5-tris[3-(trimethoxysilyl)-propyl]isocyanurate, and the resulting mixture was degassed to obtain a composition of the present invention.

Using the composition thus obtained and electrolytically colored aluminum plates, test pieces with the aluminum plates being adherends were prepared in the sam manner as in Example 1. The test pieces were then subjected to a tensile test just after the preparation (initial stage), and also after being immersed in hot water of 80° C. for 20 days, and further after being allowed to stand for 100 days in a moist heat atmosphere of 60° C. and 95% R.H., thereby to determine the respective tensile bonding strength.

The results obtained are shown in Table 3 below.

COMPARATIVE EXAMPLE 4

A comparative composition was obtained in the same manner as in Example 3 except that 1 part of γ-aminopropyltriethoxysilane and 2.5 parts of γ-glycidoxypropyltrimethoxysilane were used in place of the two adhesion promoters used in Example 3.

TABLE 2

| Adherend | Conditions | Example 2 | | Comparative Example 3 | |
|---|---|---|---|---|---|
| | | Bonding strength (kg·f/cm$^2$) | Cohesive failure (%) | Bonding strength (kg·f/cm$^2$) | Cohesive failure (%) |
| Glass | Initial stage | 8.1 | 100 | 7.2 | 100 |
| | 60° C., 95% R.H. 100 days | 7.9 | 100 | 2.9 | 10 |
| Soft steel | Initial stage | 8.4 | 100 | 7.3 | 100 |
| | 60° C., 95% R.H. 100 days | 8.1 | 100 | 2.2 | 0 |

Using the composition thus obtained, the same tensile test as in Example 3 was conducted.

The results obtained are shown in Table 3 below.

TABLE 3

| Adherend | Conditions | Example 3 | | Comparative Example 4 | |
|---|---|---|---|---|---|
| | | Bonding strength (kg·f/cm$^2$) | Cohesive failure (%) | Bonding strength (kg·f/cm$^2$) | Cohesive failure (%) |
| Glass | Initial stage | 9.5 | 100 | 9.3 | 100 |
| | 80° C. hot water 20 days | 9.4 | 100 | 4.5 | 50 |
| | 60° C., 95% R.H. | 9.2 | 100 | 2.8 | 0 |

TABLE 3-continued

| | | Example 3 | | Comparative Example 4 | |
|---|---|---|---|---|---|
| Adherend | Conditions | Bonding strength (kg·f/cm$^2$) | Cohesive failure (%) | Bonding strength (kg·f/cm$^2$) | Cohesive failure (%) |
| | 100 days | | | | |

While the invention has been described in detail and with reference to specific embodiments thereof, it will be apparent to one skilled in the art that various changes and modifications can be made therein without departing from the spirit and scope thereof.

What is claimed is:

1. A room temperature-curable silicone rubber composition comprising
   (A) 100 parts by weight of a polydiorganosiloxane having a silanol group at the both ends thereof and having a viscosity as measured at 25° C. of from 500 to 200,000 cSt;
   (B) 0.1 to 20 parts by weight of an organosilane or a partially hydrolyzed condensate thereof, said organosilane being represented by formula (I), $$(R^1)_a SiX_{4-a} \quad (I)$$

wherein R$^1$ represents a substituted or unsubstituted monovalent hydrocarbon group, X represents an organic group bonded to the silicon atom and selected from the group consisting of an alkoxy group, an enoxy group, an organoketoxime group and an organoamide group, and a is 0 or 1;
   (C) 0.1 to 10 parts by weight of an epoxyalkylalkoxysilane represented by formula (II), $$Q-R^2-Si-(R^3)_b(OR^4)_{3-b} \quad (II)$$

represents a divalent hydrocarbon group having 1 to 4 carbon atoms, R$^3$ and R$^4$ each represents a monovalent hydrocarbon group having 1 to 4 carbon atoms, Q represents a glycidoxy group or an epoxycyclohexyl group, and b is 0 or 1; and
   (D) 0.1 to 10 parts by weight of an organosilicon group-containing isocyanurate represented by formula (III),

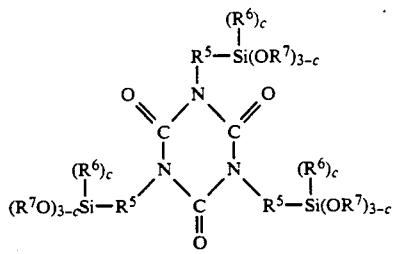

wherein R$^5$ represents a divalent hydrocarbon group having 1 to 4 carbon atoms, R$^6$ and R$^7$ each represents a monovalent hydrocarbon group having 1 to 4 carbon atoms, and c is 0 or 1.

2. The composition as claimed in claim 1, wherein the polydiorganosilane has a viscosity of from 2,000 to 100,000 cSt.

3. The composition as claimed in claim 1, wherein R$_1$ in the formula (I) is an alkyl group having 1 to carbon atoms, an alkenyl group having 2 to 3 carbon atoms, or a phenyl group.

4. The composition as claimed in claim 1, wherein the amount of component (B) is from 1 to 15 parts by weight per 100 parts by weight of component (A).

5. The composition as claimed in claim 1, wherein R$^2$ in the formula (II) is an alkylene group having 1 to 4 carbon atoms.

6. The composition as claimed in claim 1, and R$^3$ and R$^4$ in the formula (II) each is an alkyl group having 1 to 4 carbon atoms.

7. The composition as claimed in claim 1, wherein the amount of component (C) is from 0.5 to 5 parts by weight per 100 pats by weight of component (A).

8. The composition as claimed in claim 1, wherein R$^5$ in the formula (III) is an alkylene group having 1 to 4 carbon atoms.

9. The composition as claimed in claim 1, wherein R$^6$ and R$^7$ in the formula (III) each is an alkyl group having 1 to 4 carbon atoms.

10. The composition as claimed in claim 1, wherein the amount of component (D) is from 0.5 to 5 parts by weight per 100 parts by weight of component (A).

11. The composition as claimed in claim 1, wherein the molar ratio of component (C) to component (D) is from about 0.05:1 to 2:1.

* * * * *